United States Patent
Aoyama

(10) Patent No.: US 6,763,664 B2
(45) Date of Patent: Jul. 20, 2004

(54) FUEL RATIO CONTROL METHOD AND DEVICE IN A GAS TURBINE COMBUSTOR

(75) Inventor: Kuniaki Aoyama, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/262,970

(22) Filed: Oct. 3, 2002

(65) Prior Publication Data

US 2003/0061817 A1 Apr. 3, 2003

(30) Foreign Application Priority Data

Oct. 3, 2001 (JP) ........................................ 2001-307855

(51) Int. Cl.$^7$ .............................................. F02G 9/00
(52) U.S. Cl. ........................ 60/773; 60/776; 60/39.281
(58) Field of Search ................... 60/773, 776, 39.281, 60/744, 39.27, 737

(56) References Cited

U.S. PATENT DOCUMENTS

| | | | | |
|---|---|---|---|---|
| 4,337,616 A | * | 7/1982 | Downing | 60/39.281 |
| 5,622,053 A | * | 4/1997 | Freen | 60/603 |
| 5,791,145 A | * | 8/1998 | Freen | 60/603 |
| 5,916,126 A | * | 6/1999 | Szillat et al. | 60/778 |
| 6,116,016 A | * | 9/2000 | Wada et al. | 60/39.17 |
| 6,202,601 B1 | * | 3/2001 | Ouellette et al. | 123/27 GE |

FOREIGN PATENT DOCUMENTS

JP                63-134825            6/1988

* cited by examiner

Primary Examiner—Justine R. Yu
Assistant Examiner—William H. Rodriguez
(74) Attorney, Agent, or Firm—Oblon, Spivak, McClelland, Maier & Neustadt, P.C.

(57) ABSTRACT

A fuel ratio control method and a device therefor in a gas turbine combustor are provided in which supply ratio of pilot fuel to main fuel is appropriately maintained to thereby avoid unstable combustion, such as combustion vibration or misfire, and to realize a low NOx combustion. Fuel ratio control signal CSO is set corresponding to generator output $L_{GEN}$ put out by a generator output input unit 1. Pilot fuel ratio control is performed by correcting the fuel ratio control signal CSO corresponding to condition change in both or either one of combustion air and fuel. The condition change in the combustion air is at least one of changes in compressor on-line vane washing, ambient humidity, ambient pressure, etc. and the condition change in the fuel is a change in fuel component. The signal correction is also made by gas turbine deterioration factor or change rate in the generator output.

11 Claims, 1 Drawing Sheet

FUEL RATIO CONTROL METHOD AND DEVICE IN A GAS TURBINE COMBUSTOR

BACKGROUND OF THE INVENTION

1. Field of the Invention

The present invention relates to a fuel ratio control method and a device therefor in a gas turbine combustor comprising a pilot nozzle and a main nozzle, for controlling a fuel ratio of pilot fuel supplied into the pilot nozzle to main fuel supplied into the main nozzle.

2. Description of the Prior Art

In a gas turbine combustor, in order to hold a stable combustion, there is often provided a pilot nozzle for effecting a combustion by two kinds of nozzles of the pilot nozzle and a main nozzle. In the pilot nozzle, a diffusion type combustion is effected wherein pilot flames are held by pilot fuel of about 10% of the entire fuel. The remaining fuel of about 90% is a main fuel supplied into the main nozzle. The main fuel is mixed beforehand with air for a premixed combustion.

In order to reduce NOx amount generated by the combustion, it is preferable to minimize the pilot fuel used for the diffusion type combustion. On the other hand, however, if the pilot fuel is reduced, there occurs a case where NOx amount rather increases by an unstable combustion caused by changes in the combustion state. Because of such circumstances, it is necessary to effect a stable combustion by the minimum pilot fuel. For this purpose, a fuel ratio control of the pilot fuel to the main fuel is extremely important in the gas turbine combustor.

It is therefore an object of the present invention to provide a fuel ratio control method and a device therefor in a gas turbine combustor that is constructed so as to effect a combustion by pilot fuel and main fuel, by which a ratio of pilot fuel supply to main fuel supply is appropriately maintained so as to avoid the unstable combustion, such as combustion vibration or misfire, and to realize a low NOx combustion.

SUMMARY OF THE INVENTION

In order to achieve the abovementioned object, the present invention provides the following fuel ratio control method, that is, in a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; setting a fuel ratio control signal corresponding to a generator output $L_{GEN}$ of the generator; and performing a pilot fuel ratio control by correcting the fuel ratio control signal corresponding to a condition change in both or either one of combustion air and fuel supplied into the gas turbine combustor.

In the fuel ratio control method of the above invention, while the fuel ratio control signal is set corresponding to the generator output, this fuel ratio control signal is corrected corresponding to the condition change in both or either one of the combustion air and the fuel. Hence, the fuel ratio control signal according to the present invention becomes such one as accurately corresponds to the generator output on which at least one of the condition changes in the combustion air and the fuel has been well reflected. Thereby, the fuel ratio can be appropriately maintained and a low NOx combustion in the gas turbine combustor can be realized.

Also, in order to achieve the abovementioned object, the present invention provides the following fuel ratio control method, that is, in a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; computing a ratio $\alpha$ of a generator output $L_{GEN}$ of the generator to a function $F(P_2)$ generated on the basis of a combustor inner air pressure $P_2$, that is, $\alpha = L_{GEN}/F(P_2)$; setting a fuel ratio control signal corresponding to the ratio $\alpha$; and performing a pilot fuel ratio control by correcting the fuel ratio control signal corresponding to a condition change in both or either one of combustion air and fuel supplied into the gas turbine combustor.

In the fuel ratio control method of the above invention, while the fuel ratio control signal is set corresponding to the ratio $\alpha = L_{GEN}/F(P_2)$, that is, the ratio $\alpha$ of the generator output $L_{GEN}$ to the function $F(P_2)$ generated on the basis of the combustor inner air pressure $P_2$, this fuel ratio-control signal is corrected corresponding to the condition change in both or either one of the combustion air and the fuel. Hence, the fuel ratio control signal according to the present invention becomes such one as accurately corresponds to the generator output on which at least one of the condition changes in the combustion air and the fuel has been well reflected. Thereby, the fuel ratio can be appropriately maintained and a low NOx combustion in the gas turbine combustor can be realized.

As used in the fuel ratio control method in the gas turbine combustor according to the present invention, the condition change in the combustion air may be at least one of a compressor on-line vane washing signal, an ambient humidity change signal and an ambient pressure change signal. Also, as used in the fuel ratio control method in the gas turbine combustor according to the present invention, the condition change in the fuel may be a fuel component change signal.

Thus, the fuel ratio control signal according to the present invention becomes such one as accurately corresponds to the ratio $\alpha = L_{GEN}/F(P_2)$, that is, the ratio $\alpha$ of the generator output $L_{GEN}$ to the function $F(P_2)$ generated on the basis of the combustor inner air pressure $P_2$, on which the compressor on-line vane washing, the ambient humidity change, the ambient pressure change, the fuel component change, etc. have been well reflected.

Also, in order to achieve the abovementioned object, the present invention provides the following fuel ratio control method, that is, in a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; setting a fuel ratio control signal corresponding to a generator output $L_{GEN}$ of the generator; and performing a pilot fuel ratio control by correcting the fuel ratio control signal corresponding to a change rate in the generator output $L_{GEN}$.

According to the fuel ratio control method of the above invention, the pilot fuel ratio control can be performed based on the pilot fuel ratio control signal that appropriately corresponds to the changes in the generator output on which the change rate in the generator output has been well reflected.

Also, in order to achieve the abovementioned object, the present invention provides the following fuel ratio control method, that is, in a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; computing a ratio α of a generator output $L_{GEN}$ of the generator to a function $F(P_2)$ generated on the basis of a combustor inner air pressure $P_2$, that is, $α=L_{GEN}/F(P_2)$; setting a fuel ratio control signal corresponding to the ratio α; and performing a pilot fuel ratio control by correcting the fuel ratio control signal corresponding to a change rate in the generator output $L_{GEN}$.

According to the fuel ratio control method of the above invention, the fuel ratio control in the gas turbine combustor can be performed by the fuel ratio control signal that accurately corresponds to the ratio $α=L_{GEN}/F(P_2)$, that is, the ratio α of the generator output $L_{GEN}$ to the function $F(P_2)$ generated on the basis of the combustor inner air pressure $P_2$, on which the change rate in the generator output has been well reflected.

Furthermore, in order to achieve the abovementioned object, the present invention provides the following fuel ratio control method, that is, in a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; setting a fuel ratio control signal corresponding to a generator output $L_{GEN}$ of the generator, or computing and setting a fuel ratio control signal corresponding to a ratio α of a generator output $L_{GEN}$ of the generator to a function $F(P_2)$ generated on the basis of a combustor inner air pressure $P_2$, that is, $α=L_{GEN}/F(P_2)$; and performing a pilot fuel ratio control by correcting the fuel ratio control signal corresponding to a gas turbine deterioration factor.

The gas turbine deterioration factor in this case may be obtained either from the generator output, a fuel flow rate, an ambient pressure, an ambient temperature and a fuel component or from the combustor inner air pressure, an exhaust gas temperature and the generator output.

Thus, according to the present invention, the fuel ratio control in the gas turbine combustor can be appropriately performed by the fuel ratio control signal that accurately corresponds to the generator output $L_{GEN}$ or the ratio α of the generator output $L_{GEN}$ to the function $F(P_2)$ generated on the basis of the combustor inner air pressure $P_2$, on which the gas turbine deterioration factor has been well reflected.

Also, in order to achieve the abovementioned object, the present invention provides the following fuel ratio control device, that is, in a gas turbine combustor being constructed to effect a combustion of pilot fuel and main fuel and being a part of a gas turbine comprising a generator, a fuel ratio control device for controlling a fuel ratio of the pilot fuel to the main fuel, comprising; a computing unit inputted with a generator output $L_{GEN}$ of the generator and a function $F(P_2)$ generated on the basis of a combustor inner air pressure $P_2$ for computing a ratio α thereof, that is, $α=L_{GEN}/F(P_2)$; a function setting unit inputted with an output from the computing unit for putting out a fuel ratio control signal; an adder or integrator inputted with at least one of correction signals corrected by a combustion air condition, a fuel condition and a change rate in the generator output $L_{GEN}$ for correcting the fuel ratio control signal; and an adder or integrator inputted with at least one of correction signals corrected by an ambient pressure and a turbine deterioration factor for correcting the output from the computing unit.

According to the fuel ratio control device of the above invention, the fuel ratio control signal is corrected by at least one of the combustion air condition change, the fuel condition change, the generator output change rate and the turbine deterioration factor, and the fuel supply ratio of the pilot fuel to the main fuel is appropriately maintained. Thus, a fuel ratio control in the gas turbine combustor that avoids an unstable combustion, such as combustion vibration, misfire, etc. and effects a low NOx combustion can be realized.

DESCRIPTION OF THE PREFERRED EMBODIMENTS

Figure 1:
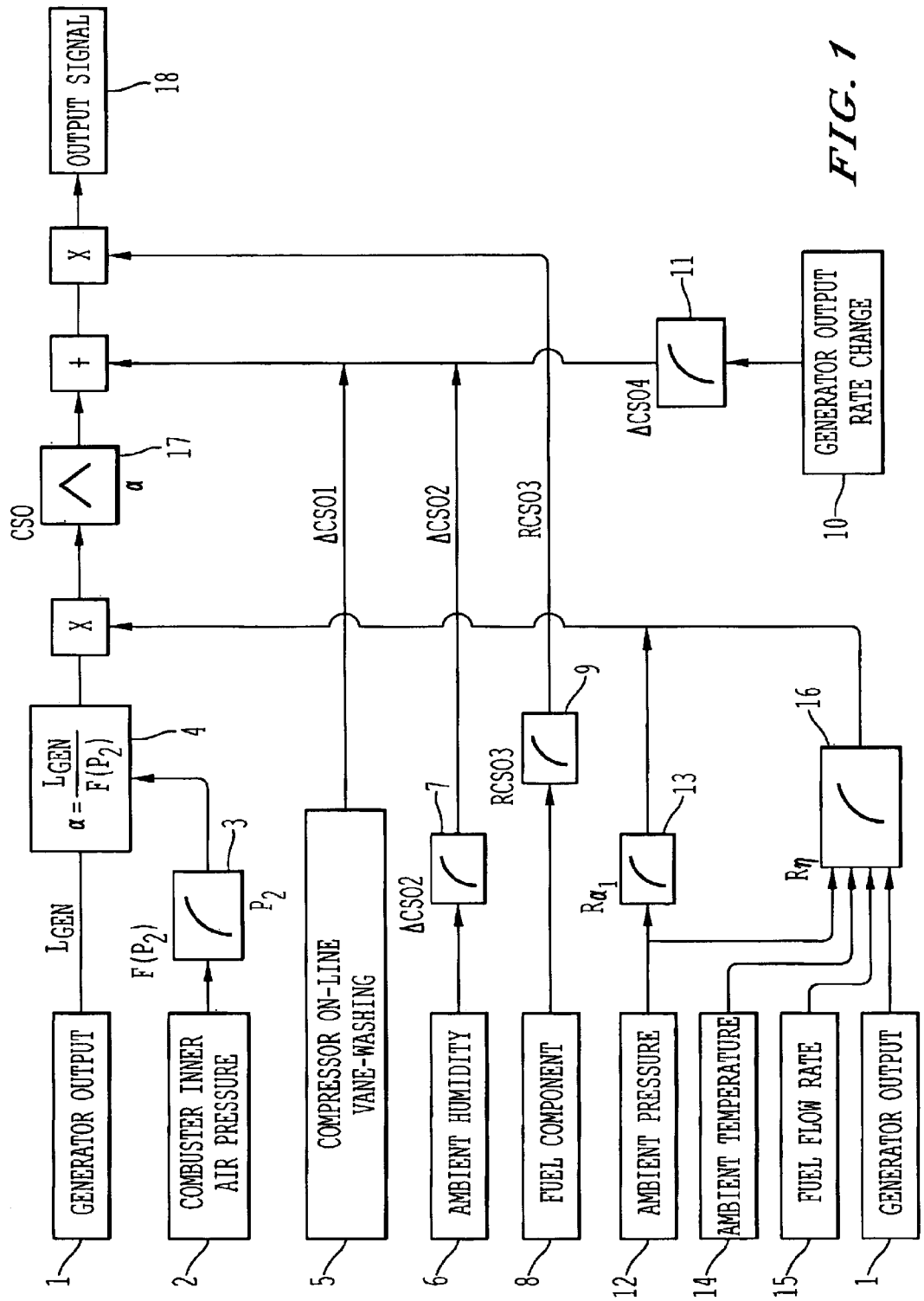
FIG. 1 is a block diagram showing an embodiment with respect to the method of the present invention.

Herebelow, an embodiment according to the present invention will be described concretely with reference to the block diagram of FIG. 1.

In FIG. 1, numeral 1 designates a generator output input unit, that measures a generator output and puts out a generator output $L_{GEN}$. Numeral 2 designates a combustor inner air pressure input unit, that measures air pressure $P_2$ in a combustor casing and puts it out. Numeral 3 designates a function generator, that generates a function $F(P_2)$ by a signal of the air pressure $P_2$ from the combustor inner air pressure input unit 2. Numeral 4 designates a computing unit, that computes a ratio $α=L_{GEN}/F(P_2)$ by the generator output $L_{GEN}$ from the generator output input unit 1 and the function $F(P_2)$ generated by the function generator 3. The ratio α computed at the computing unit 4 is sent to a function setting unit 17, as will be described later.

Numeral 5 designates a compressor on-line vane washing input unit for performing a compressor on-line vane washing. When the compressor on-line vane washing is performed, the input unit 5, corresponding thereto, puts out a correction signal ΔCSO1 for a fuel ratio control signal CSO, that is to be described later. The correction signal ΔCSO1 may be a predetermined value but preferably is decided by a function of an on-line vane washing inlet pressure.

Numeral 6 designates an ambient humidity input unit, that measures an ambient humidity and puts it out into a function generator 7 and the function generator 7 puts out a correction signal ΔCSO2 corresponding to the value of the ambient humidity.

Numeral 8 designates a fuel component input unit, that puts out a signal showing fuel component into a function generator 9 and the function generator 9 computes and puts out a correction signal or a correction function RCSO3 corresponding to changes in the fuel component. Numeral 10 designates a generator output change rate input unit. If the generator output changes, this input unit 10 gives the change rate in the generator output to a function generator 11 and the function generator 11 puts out a correction signal ΔCSO4 corresponding to the change rate in the generator output.

Numeral 12 designates an ambient pressure input unit. A signal showing an ambient pressure is given to a function generator 13 and the function generator 13 computes a function $Rα_1$. Numeral 14 designates an ambient temperature input unit, that puts out a signal corresponding to an ambient temperature. Numeral 15 designates a fuel flow rate input unit, that puts out a signal corresponding to a flow rate of fuel supplied into the gas turbine combustor.

Numeral 16 designates a turbine deterioration factor input unit. This input unit 16 is supplied with signals from the ambient pressure input unit 12, the ambient temperature input unit 14, the fuel flow rate input unit 15 and the generator output input unit 1. A turbine deterioration, that is obtained from the fuel flow rate and the generator output, is corrected by the ambient pressure and the ambient temperature, and thereby the turbine deterioration factor Rη is computed.

The ratio α of the generator output $L_{GEN}$ put out by the computing unit 4 to the function $F(P_2)$ generated on the basis of the combustor inner air pressure is multiplied by the turbine deterioration factor Rη and the function $Rα_1$ of the ambient pressure put out by the function generator 13, so that the ratio α is corrected. This corrected ratio α is inputted into the function setting unit 17, that in turn puts out a fuel ratio control signal CSO. Also, the correction signal ΔCSO1 from the compressor on-line vane washing input unit 5, the correction signal ΔCSO2 from the function generator 7 and the correction signal ΔCSO4 from the function generator 11 are added to the fuel ratio control signal CSO put out by the function setting unit 17, so that the value CSO is corrected.

Also, by the correction function RCSO3 put out by the function generator 9 corresponding to the fuel component, a signal put out as a fuel ratio control signal 18 is multiplied, so that this signal is corrected corresponding to the changes in the fuel component.

As mentioned above, where the ratio α of the generator output $L_{GEN}$ from the generator output input unit 1 to the function $F(P_2)$ generated on the basis of the pressure put out by the combustor inner air pressure input unit 2 is taken, that is, $α=L_{GEN}/F(P_2)$, the fuel ratio control signal CSO, corresponding to the ratio α, is corrected by the compressor on-line vane washing, the changes in the ambient humidity, fuel component and ambient pressure, the turbine deterioration and the change rate in the generator output. Thereby, the fuel ratio is finely controlled and a stable combustion in the gas turbine combustor can be maintained.

In the above, while the present invention has been described concretely based on the embodiment, the invention is by no means limited to the embodiment but may naturally be added with various modifications and amendments thereof within the scope of the appended claims.

For example, in the abovementioned embodiment, the correction signals ΔCSO1, ΔCSO2 and ΔCSO4 are added to the fuel ratio control signal CSO and the fuel ratio control signal CSO is multiplied by the correction function RCSO3, but the correcting mode of the fuel ratio control signal by these correction signals can be arbitrarily selected. Also, to use all of these correction signals and the correction function is not essential but any one thereof or a combination of two or more thereof may be arbitrarily selected.

What is claimed is:

1. In a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; setting a fuel ratio control signal corresponding to a generator output $L_{GEN}$ of said generator; and performing a pilot fuel ratio control by correcting said fuel ratio control signal corresponding to a condition change in both or either one of combustion air and fuel supplied into said gas turbine combustor.

2. In a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; computing a ratio α of a generator output $L_{GEN}$ of said generator to a function $F(P_2)$ generated on the basis of a combustor inner air pressure $P_2$, that is, $α=L_{GEN}/F(P_2)$; setting a fuel ratio control signal corresponding to said ratio α; and performing a pilot fuel ratio control by correcting said fuel ratio control signal corresponding to a condition change in both or either one of combustion air and fuel supplied into said gas turbine combustor.

3. A fuel ratio control method as claimed in claim 1 or 2, wherein said condition change in the combustion air is given by at least one of a compressor on-line vane washing signal, an ambient humidity change signal and an ambient pressure change signal.

4. A fuel ratio control method as claimed in claim 1 or 2, wherein said condition change in the fuel is given by a fuel component change signal.

5. In a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; setting a fuel ratio control signal corresponding to a generator output $L_{GEN}$ of said generator; and performing a pilot fuel ratio control by correcting said fuel ratio control signal corresponding to a change rate in said generator output $L_{GEN}$.

6. In a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; computing a ratio α of a generator output $L_{GEN}$ of said generator to a function $F(P_2)$ generated on the basis of a combustor inner air pressure $P_2$, that is, $α=L_{GEN}/F(P_2)$; setting a fuel ratio control signal corresponding to said ratio α; and performing a pilot fuel ratio control by correcting said fuel ratio control signal corresponding to a change rate in said generator output $L_{GEN}$.

7. In a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; setting a fuel ratio control signal corresponding to a generator output $L_{GEN}$ of said generator; and performing a pilot fuel ratio control by correcting said fuel ratio control signal corresponding to a gas turbine deterioration factor obtained from said generator output $L_{GEN}$, a fuel flow rate, an ambient pressure, an ambient temperature and a fuel component.

8. In a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; setting a fuel ratio control signal corresponding to a generator output $L_{GEN}$ of said generator; and performing a pilot fuel ratio control by correcting said fuel ratio control signal corresponding to a gas turbine deterioration factor obtained from a combustor inner air pressure, an exhaust gas temperature and said generator output $L_{GEN}$.

9. In a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; computing a fuel ratio control signal corresponding to a ratio α of a generator output $L_{GEN}$ of said generator to a function $F(P_2)$ generated on the basis of a combustor inner air pressure $P_2$, that is, $\alpha=L_{GEN}/F(P_2)$; and performing a pilot fuel ratio control by correcting said fuel ratio control signal corresponding to a gas turbine deterioration factor obtained from said generator output $L_{GEN}$, a fuel flow rate, an ambient pressure, an ambient temperature and a fuel component.

10. In a gas turbine combustor being constructed to effect a combustion of pilot fuel and main fuel and being a part of a gas turbine comprising a generator, a fuel ratio control method for controlling a fuel ratio of the pilot fuel to the main fuel, comprising the steps of; computing a fuel ratio control signal corresponding to a ratio $\alpha$ of a generator output $L_{GEN}$ of said generator to a function $F(P_2)$ generated on the basis of a combustor inner air pressure $P_2$, that is, $\alpha=L_{GEN}/F(P_2)$; and performing a pilot fuel ratio control by correcting said fuel ratio control signal corresponding to a gas turbine deterioration factor obtained from a combustor inner air pressure, an exhaust gas temperature and said generator output $L_{GEN}$.

11. In a gas turbine combustor being constructed to effect a combustion of pilot fuel and main fuel and being a part of a gas turbine comprising a generator, a fuel ratio control device for controlling a fuel ratio of the pilot fuel to the main fuel, comprising; a computing unit inputted with a generator output $L_{GEN}$ of said generator and a function $F(P_2)$ generated on the basis of a combustor inner air pressure $P_2$ for computing a ratio $\alpha$ thereof, that is, $\alpha=L_{GEN}/F(P_2)$; a function setting unit inputted with an output from said computing unit for putting out a fuel ratio control signal; an adder or integrator inputted with at least one of correction signals corrected by a combustion air condition, a fuel condition and a change rate in said generator output $L_{GEN}$ for correcting said fuel ratio control signal; and an adder or integrator inputted with at least one of correction signals corrected by an ambient pressure and a turbine deterioration factor for correcting the output from said computing unit.

\* \* \* \* \*